(12) United States Patent
Le Rouzic et al.

(10) Patent No.: US 9,648,050 B2
(45) Date of Patent: May 9, 2017

(54) ROUTING OF A SERVICE REQUEST AIMED AT AN IMS SUBSCRIBER

(71) Applicant: Orange, Paris (FR)

(72) Inventors: Jean-Claude Le Rouzic, Trebeurden (FR); Guy Loaec, Ploudaniel (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/648,866

(22) PCT Filed: Nov. 29, 2013

(86) PCT No.: PCT/FR2013/052897
§ 371 (c)(1),
(2) Date: Jun. 1, 2015

(87) PCT Pub. No.: WO2014/083289
PCT Pub. Date: Jun. 5, 2014

(65) Prior Publication Data
US 2015/0334135 A1    Nov. 19, 2015

(30) Foreign Application Priority Data
Nov. 30, 2012    (FR) ..................... 12 61512

(51) Int. Cl.
*H04L 29/06*    (2006.01)
*H04M 1/64*    (2006.01)

(52) U.S. Cl.
CPC ...... *H04L 65/1016* (2013.01); *H04L 65/1036* (2013.01); *H04L 65/1046* (2013.01); *H04L 65/1069* (2013.01)

(58) Field of Classification Search
CPC ............. H04L 65/1016; H04L 65/1036; H04L 65/1046; H04L 65/1069

(Continued)

(56) References Cited

U.S. PATENT DOCUMENTS

| | | | | |
|---|---|---|---|---|
| 2005/0232225 | A1* | 10/2005 | Pelaez | H04L 29/12594 370/351 |
| 2006/0077965 | A1* | 4/2006 | Garcia-Martin | H04M 3/42195 370/352 |
| 2007/0058789 | A1* | 3/2007 | Lim | H04W 76/025 379/88.17 |

(Continued)

FOREIGN PATENT DOCUMENTS

| | | |
|---|---|---|
| EP | 1750400 A1 | 2/2007 |
| WO | 2006038099 A2 | 4/2006 |

OTHER PUBLICATIONS

International Search Report and Written Opinion dated Feb. 14, 2014 for corresponding International Application No. PCT/FR2013/052897, filed Nov. 29, 2013.

(Continued)

*Primary Examiner* — Nathan Taylor
(74) *Attorney, Agent, or Firm* — David D. Brush; Westman Champlin & Koehler, P.A.

(57) ABSTRACT

A serving call server control function (S-CSCF) server in an IMS network is configured to receive a service request targeting a client device belonging to the IMS network and under the charge of the S-CSCF server. The S-CSCF server uses information elements contained in the service request to perform verifications, including: determining that the requested service is a telephone service; and determining that the user of the target client device targeted in the service request has not subscribed to a telephone service with the operator of the IMS network. If the result of the verifications is positive, the S-CSCF server directs the service request to a telephone network to which the target client device belongs. The server is applicable to subscribers of an IMS network benefiting from non-conversational services in packet mode from the IMS network, but having telephone services supplied thereto by a circuit-switched network.

11 Claims, 1 Drawing Sheet

(58) Field of Classification Search
USPC .............. 455/445; 370/328, 329, 351, 352; 379/88.17
See application file for complete search history.

(56) References Cited

U.S. PATENT DOCUMENTS

| | | | | |
|---|---|---|---|---|
| 2009/0122793 | A1* | 5/2009 | Yang | H04L 65/40 370/352 |
| 2010/0124216 | A1* | 5/2010 | Ku | H04L 29/1216 370/352 |
| 2011/0090845 | A1* | 4/2011 | Bishop | H04L 65/1069 370/328 |
| 2013/0021998 | A1* | 1/2013 | Shatsky | H04W 28/26 370/329 |
| 2013/0094494 | A1* | 4/2013 | Lim | H04W 76/025 370/352 |

OTHER PUBLICATIONS

"3rd Generation Partnership Project; Technical Specification Group Services and System Aspects; Voice Call Continuity (VCC) Between Circuit Switched (CS) and IP Multimedia Subsystem (IMS); Stage 2 (Release 7); 23206-710", ETSI Draft; 23206-710, European Telecommunications Standards Institute (ETSI), 650, Route Des Lucioles; F-06921, Sophia-Antipolis; France, vol. zArchive, No. V7.1.0, Feb. 1, 2007 (Feb. 1, 2007), pp. 1-35, XP014138036.

Poikselka, M.: "The UMS IP Multimedia Concepts and Services", Jan. 1, 2009 (Jan. 1, 2009), John Wiley & Sons, Chichester, BG, XP002711515.

Huawei: Change Request for "Service Domain Selection for Mobile Terminated Calls from the IMS", 3GPP—SA WG2 Meeting #94, Version 11.0.0, dated Oct. 11, 2012, New Orleans, Louisiana, USA, 6 pages.

English translation of the Written Opinion dated May 31, 2015 for corresponding International Patent Application No. PCT/FR2013/052897, filed Nov. 29, 2013.

Rosenberg et al. "SIP: Session Initiation Protocol", Network Working Group, RFC 3261, Jun. 2002.

Roach, Session Initiation Protocol (SIP) Specific Event Notification, Network Working Group, RFC 3265, Jun. 2002.

* cited by examiner

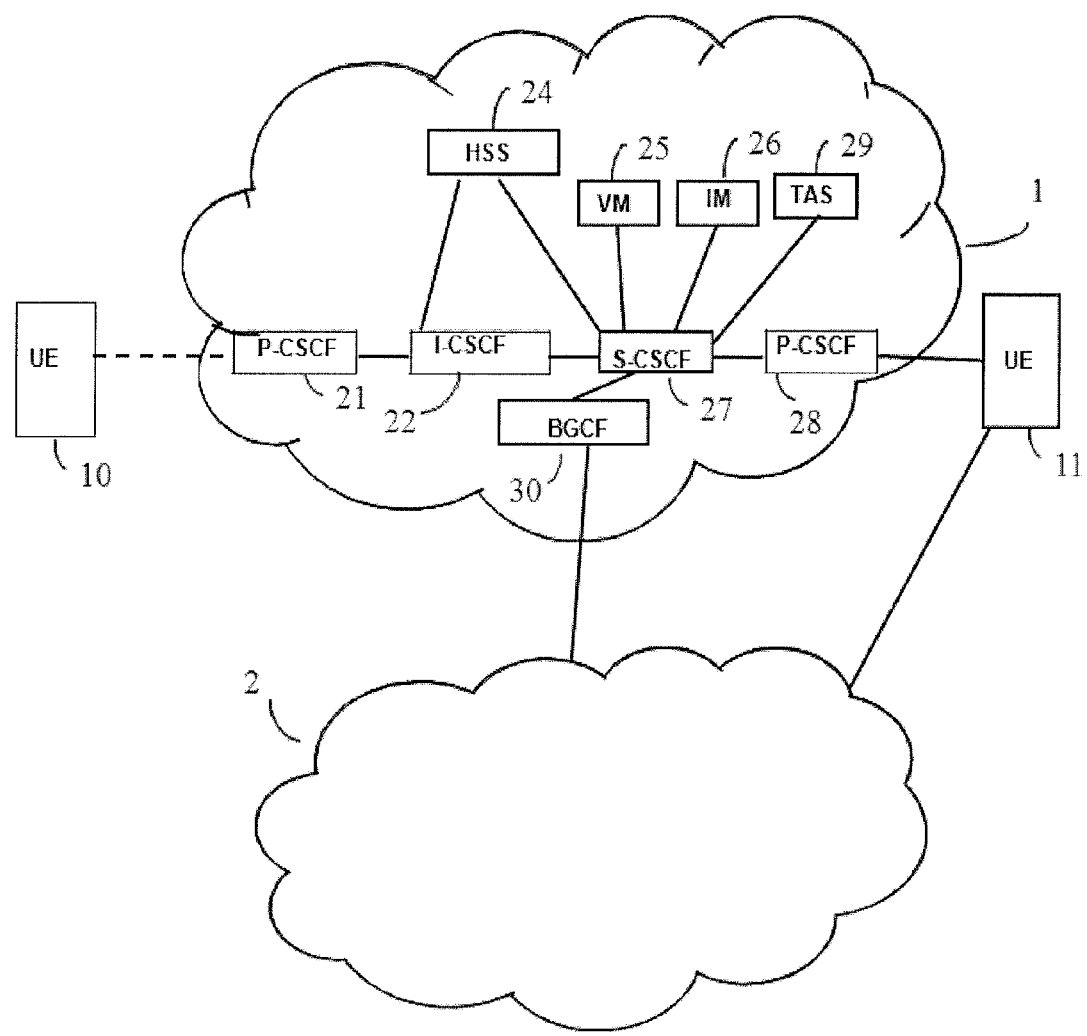

ROUTING OF A SERVICE REQUEST AIMED AT AN IMS SUBSCRIBER

CROSS-REFERENCE TO RELATED APPLICATIONS

This application is a Section 371 National Stage Application of International Application No. PCT/FR2013/052897, filed Nov. 29, 2013, the content of which is incorporated herein by reference in its entirety, and published as WO 2014/083289 on Jun. 5, 2014, not in English.

FIELD OF THE DISCLOSURE

The present invention relates to Internet protocol (IP) type communications networks, and among IP networks, it relates in particular to those that are suitable for implementing advanced session control protocols. IP networks serve in particular to transmit conversation data in the context of services such as "voice over IP" (VoIP), "content sharing", or "instant messaging".

More particularly, the present invention relates to routing a VoIP call issued by a client device belonging to an IP network.

In this respect, in the context of the present invention, a client device (also known as "user equipment") is said to "belong" to the network of a given operator when the user of the client device has an account with that operator, and this applies regardless of which access network the client device uses to connect to the network of the operator. By way of example, such client devices may be a fixed or mobile terminal, or a residential gateway or a business gateway, or indeed a gateway belonging to the operator and referred to as a "voice gateway", such as a digital subscriber access multiplexer with session initiation protocol (DSLAM-SIP), i.e. a device for collecting digital subscriber line (DSL) traffic passing via some number of telephone lines.

BACKGROUND OF THE DISCLOSURE

Conventional advanced session control protocols, such as a session initiation protocol (SIP) make use of so-called "signaling" messages, which are messages enabling a terminal to request a connection with another terminal, and also messages signaling that a telephone line is busy, or that the called telephone is ringing, or indeed that such a telephone is connected to the network and may be reached in such and such a manner.

The SIP was defined by the Internet engineering task force (IETF) in a document RFC 3261. This protocol makes it possible to set up, to modify, and to terminate multimedia sessions in a network using IP. SIP has subsequently been extended, in particular in document RFC 3265. This extension makes event notification procedures possible.

SIP is used in particular in infrastructures of the IP multimedia subsystem (IMS) type. The IMS was defined by the 3rd Generation Partnership Project (3GPP) Standardization Organization and by Telecommunications and Internet Converged Services and Protocols for Advanced Networking (TISPAN). It comprises a network architecture that was introduced by 3GPP for mobile networks and then extended by TISPAN for fixed networks. This architecture enables multimedia sessions to be set up dynamically and controlled between two clients, and it also enables resources to be reserved in the network used for transporting multimedia streams. By means of this architecture, network operators can conveniently implement a management policy, can provide a predetermined quality of service (QoS), and can calculate how much to bill clients. At present, IMS makes it possible to access services such as telephony, video telephony, and instant messaging, and it also manages interactions between them. It should be recalled for example that instant messaging (IM), also referred to as "chat", enables text messages and files to be exchanged almost instantaneously, thereby enabling two users connected to the same network (such as the Internet) to have an interactive dialog.

When a user seeks to benefit from services made available by an IMS network, the user sends signaling messages to the network that may include in particular various types of request.

Firstly, apart from exceptions (such as certain emergency calls), the user's client device must register with the network. When the network is incapable of establishing a link between the registration and an earlier registration (e.g. as a result of a network failure, or as a result of the terminal being switched off for a duration longer than a predetermined value), the registration is considered as being an initial registration. After an initial registration, the user's client device must periodically send requests to the network in order to confirm that it desires to maintain its registration.

Thus, in order to be able to register client devices, IMS networks comprise one or more registration servers known as "serving-call server control function" (S-CSCF) servers suitable (among other functions) for managing the procedure for registering devices connected to the network.

In addition, such networks comprise one or more servers known as "interrogating-call server control function" (I-CSCF) servers, which indeed are often physically combined with servers of the S-CSCF type so as to constitute servers known as "I/S-CSCF" servers, that act when registering a client device to interrogate a home subscriber server (HSS) in order to be able to select an S-CSCF server that possesses the characteristics that are necessarily required for reaching the level of service to which the user has subscribed (and possibly also characteristics that are optionally required, where appropriate). Each HSS contains a client data database and is thus the equivalent in an IP network of a home location register (HLR) of the kind used in global system for mobile (GSM) networks. Each HSS contains the "profile" of a certain number of client devices of the network, which profile contains their registration states, together with authentication and location data.

After an S-CSCF server has thus been allocated to a user, each user can send a request to subscribe to certain services, which request is valid for the current connection. The general principle is that a client device can subscribe to a particular technical service with the help of an appropriate request (SIP SUBSCRIBE). Thus, when subscribing to the state of a resource, event notifications (SIP NOTIFY) are sent to the client device whenever the state of the resource changes; for example, when the user of a terminal has a voicemail box on the network, the terminal may subscribe to being notified when a message has been left, i.e. it may request to be informed each time a message is recorded in the voicemail box; likewise, the user terminal may request to be notified about its own registration state, and so on.

When a user issues a service request targeting another user (e.g. in the context of making a telephone call), the service request is received by the initial or "originating" S-CSCF server in charge of the user making the request. This S-CSCF server begins by verifying that the requested service is in compliance with the subscription of the requesting user. If so, the S-CSCF server determines whether the target user is known to the IMS network; two situations can then arise:

either the target user is known to the IMS network, in which case the request is transmitted to the I-CSCF server that then routes it to the final or "terminating" S-CSCF server in charge of the target user; or else the target user is not known to the IMS network, in which case the request is transmitted to a breakout gateway control function (BGCF) server; this BGCF server then consults routing tables and on that basis directs the request:

either to a media gateway control function (MGCF) server that controls a trunking media gateway function (T-MGF) gateway serving to transfer appropriate media streams to the entry point of a non-IP network to which the target user belongs; or else to the entry point of an IP network managed by a third party operator.

SUMMARY

The present invention relates in particular to means for putting into place in an IMS network for routing a VoIP call issued by a client device belonging to an IP network so that it reaches a destination client device belonging to an IMS network (identical or not identical to said IP network) but that does not necessarily benefit from VoIP.

Concerning the destination client device, it may in particular be a mobile terminal. In this respect, it should be observed that the invention is compatible with all known radio technologies, such as time-division, code-division, wideband code-division, and orthogonal frequency division multiple access (TDMA, CDMA, W-CDMA, OFDMA) etc. It applies in particular to cellular networks making use of GSM technology, or general packet radio service (GPRS) technology, of universal mobile telecommunications system (UMTS) technology, or indeed of long term evolution (LTE) technology.

It should be recalled that GSM technology makes use of a circuit-switched (CS) data transmission medium.

The GPRS standard is a mobile telephony standard derived from the GSM standard and enabling a higher data rate. It is often referred to as 2.5G, where "G" stands for generation and "2.5" indicates that it is a technology halfway between GSM (2nd generation) and UMTS (3rd generation). GPRS adds so-called "packet-switched" (PS) transmission mode to the CS transmission mode, which covers all services associated with telephony. The subscribers of a mobile operator can thus access services that make use of IP, such as electronic messaging, file downloading, or consulting Internet sites.

UMTS is capable both of circuit-mode switching and of packet-mode switching. UMTS uses W-CDMA technology, and constitutes the European implementation of the International Telecommunication Union (ITU) IMT-2000 specifications for 3G cellular radio systems. UMTS enables data contained in IP packets to be exchanged with servers belonging to a network outside the UMTS network, such as the Internet.

Officially, the LTE standard forms part of the UMTS standard, however it incorporates numerous modifications and improvements, in particular the use of OFDM for the down link and of single-carrier frequency division multiple access (SC-FDMA) for the up link (instead of W-CDMA for both links as in UMTS). LTE requires dedicated radio coverage that is distinct from UMTS coverage, and it enables data rates to be used that are much faster than in 2G and 3G.

The above-mentioned IMS architecture has the advantage of providing convergence between fixed and mobile access networks. For mobile networks, the IMS architecture is necessary in particular for operators beginning to deploy LTE technology and seeking to offer a telephony over IP service; with LTE technology, mobile terminals no longer have direct access to a CS network, but only to a PS network.

It is therefore possible for operators to use the same infrastructure for deploying services of the VoIP type, such as Voice over LTE (VoLTE), and other services of data type (i.e. non-conversational packet mode services), such as enhanced rich communication services (RCS-e).

RCS-e (cf. document "RCS-e—advanced communications: services and client specification, Version 1.2", published on Sep. 23, 2011 by the GSM Association) includes instant messaging services, and image and video sharing services. These services (see Section 3.3 of the above-mentioned document) are supplied by an IP network in parallel with any possible voice communication set up in a CS network; while they are in voice communication, one RCS-e subscriber can thus, by way of example, send to the other party images that are being filmed by a camera incorporated in the mobile telephone of the RCS-e subscriber.

During the stage of introducing LTE networks, operators need to maintain CS mobile networks making use of 2G and 3G technologies in parallel with these new 4G networks. Furthermore, the 3GPP has defined ways of transferring access when a subscriber making a call moves from an LTE cell to a 2G or 3G cell, in order to ensure continuity of telephone service.

This is thus a situation in which certain operators deploy LTE technology and an IMS network for providing data services only, whereas other operators make both VoIP services and data services available on their LTE/IMS network, and furthermore, still other operators use their IMS core network to provide certain data services that may be combined by their users with a telephone call that has been set up (at least in part) over a CS network (one such combination being illustrated by RCS-e).

In this context, new routing functions are necessary in IMS core networks. The identities used in a fixed or mobile telephone network, and the identities used in an IMS network are indeed identical (namely users' telephone numbers), but in order to operate different services (telephone service, RCS-e service, etc.), a service request (e.g. a telephone call) targeting a destination user known to the IMS network is transmitted to the terminating S-CSCF server in charge of the user, while the IMS network needs to be capable subsequently of determining whether the service request is to be conveyed to an IP address or to a particular telephone network.

In particular, it is necessary to provide the necessary mechanism for routing a VoIP call issued by a client device belonging to an IP network to an IMS subscriber of the "pure RCS-e" type, i.e. benefiting from data services from the IMS network, but having its telephone services supplied by a CS network. Unfortunately, in the present state of 3GPP standards, there is no way of undertaking such routing in an IMS core, such that only two options are left available to operators:

either the call is rejected by the IMS core network because the called party does not subscribe to a VoIP service with the IMS network; or else the call to the called party is continued, i.e. the call is no longer rejected by the network, but by the called terminal since that terminal is (presumably) not compatible with VoIP.

Naturally, both of those solutions are commercially unacceptable, since they result in VoIP subscribers being unable to call certain telephone subscribers on CS networks.

The manufacturer Huawei has made a proposal (paragraph 7.2X to be added to the 3GPP TS 23.221 standard) to the 3GPP (at meeting No. 94 of the SA2 standardization group, New Orleans, USA, Nov. 12 to 16, 2012), which proposal seeks to resolve the problem of routing a telephone call issued by a VoIP subscriber to a mobile terminal. In that proposal, when such a call reaches the terminating I-CSCF server of the IMS domain to which the mobile terminal belongs, the I-CSCF server interrogates the HSS. The HSS decides where the call is to be directed, namely to an IMS core network or else to a CS mobile telephony domain, or indeed to a services platform. Thereafter, the HSS sends information to the I-CSCF server enabling it to direct the call either to an S-CSCF server (for processing within an IMS network), or else to a BGCF server (for processing within a CS mobile telephony domain).

That proposal presents the drawback of giving responsibility for routing decision making to the HSS: unfortunately, in the present logic of 3GPP standards, an HSS is not suitable for interpreting the user profile data that it stores, and it therefore does not know which services are made available to the called party; the fact of giving routing decisions to the HSS thus gives rise to a risk of incompatibility between the various services made available to the called party (e.g. call forwarding). Furthermore, that proposal implies changes to the interface between the I-CSCF server and the HSS.

The present invention thus relates to an S-CSCF server in an IMS network, the server including means for receiving a service request targeting a client device belonging to said IMS network and under the charge of said S-CSCF server. Said S-CSCF server is remarkable in that it also comprises means for:

using information elements contained in said service request to perform verifications comprising:
    determining that the requested service is a telephone service; and
    determining that the user of the target client device targeted in the service request has not subscribed to a telephone service with the operator of the IMS network; and
if the result of said verifications is positive, directing the service request to a telephone network to which said target client device belongs.

Thus, the present invention proposes introducing a routing function suitable for acting on the basis of information contained in the service request, in a manner that is explained in detail below, in order to determine where the request is to be directed in the IMS network to which the target client device belongs.

As described briefly above, the Huawei proposal (which in fact lies in the narrower context of a telephone call to a mobile terminal) makes provision for placing a routing function in the HSS, doubtless for the purpose of performing this routing as close as possible to the reception of the request by the terminating I-CSCF server. On the contrary, in the present invention, the service request is allowed to continue its conventional path to the terminating S-CSCF server, i.e. it is in this terminating S-CSCF server that an appropriate routing function is placed.

This placement of the routing function in accordance with the invention is advantageous since existing S-CSCF servers are capable of interpreting the service information contained in a request and of making the routing decisions that stem therefrom; as explained below in detail, this applies in particular to terminating S-CSCF servers. The invention thus makes it possible to guarantee consistency in the services given to the client device targeted in the request.

According to particular characteristics, said S-CSCF server also includes means for use when determining that the requested service is a telephone service to verify also that the format of the telephone number given in the service request does indeed comply with the standards relating to the format of telephone numbers.

By means of these provisions, continued processing of the service request is advantageously avoided if the request cannot be satisfied because it is formally erroneous.

Correspondingly, the invention also provides a routing method for routing a service request targeting a client device belonging to an IMS network, and comprising the following step:

a) the terminating S-CSCF server in charge, in said IMS network, of the target client device receiving said service request. Said method is remarkable in that it then comprises the following steps:

b) said S-CSCF server using information elements contained in said service request to perform verifications comprising:
    determining that the requested service is a telephone service; and
    determining that the user of the target client device targeted in the service request has not subscribed to a telephone service with the operator of the IMS network; and
c) if the result of said verifications is positive, the S-CSCF server directing the service request to a telephone network to which said target client device belongs.

Said service request may in particular be issued by a client device belonging to an IP network. However it could also be routed to said IMS network from a CS network as the result of a routing error, for example.

According to particular characteristics, if said S-CSCF server determines in said step b) that the requested service is a telephone service, then the S-CSCF server also verifies that the format of the telephone number given in the service request does indeed comply with the standards relating to the format of telephone numbers.

The advantages made available by these methods are essentially the same as those made available by the corresponding S-CSCF servers, as set out briefly above.

It should be observed that it is possible to implement such S-CSCF servers in the context of software instructions and/or in the context of electronic circuits.

The invention also provides a computer program downloadable from a communications network and/or stored on a computer readable medium and/or executable by a microprocessor. The computer program is remarkable in that it includes instructions for managing the operation of an S-CSCF server as set out briefly above, when executed by a computer.

The advantages made available by this computer program are essentially the same as those made available by said method.

Other aspects and advantages of the invention appear on reading the following detailed description of particular embodiments and implementations given as non-limiting examples.

BRIEF DESCRIPTION OF THE DRAWING

The description refers to accompanying FIG. 1 which is a diagram showing by way of example a system for supplying multimedia services and suitable for performing the invention.

DETAILED DESCRIPTION OF ILLUSTRATIVE EMBODIMENTS

The system shown in FIG. 1 implements an IMS type network architecture 1 of the kind described briefly above. The multimedia services made available by this IMS network 1 may comprise telephony services, video telephony services, content sharing services, presence services, instant messaging services, or television services. These services are available to a client device (or "user equipment" (UE)) 11 belonging to the network 1, enabling the UE 11 to exchange multimedia streams and session control signals in compliance with the SIP, e.g. with a UE 10.

The UE 10 belongs to an IP network that may in particular be the IMS network 1, itself. The UE 10 may be a fixed or mobile terminal, or a residential or business gateway, having SIP signaling means and possibly including means for playing back audiovisual content.

The UE 11 is a fixed or mobile terminal belonging (in addition to the IMS network 1) to a telephone network 2, e.g. a circuit-switched (CS) network.

As shown in FIG. 1, in addition to the IP transport infrastructure (not shown), this IMS network 1 comprises:
- at least one S-CSCF server; the S-CSCF server 27 serves in particular to manage the procedure of registering devices connected to the network 1; the S-CSCF server 27 also manages the routing of signaling between the UE 11 and the voice messaging (VM), instant messaging (IM), and telephony application servers (TAS) 25, 26, and 29;
- at least one I-CSCF server; the I-CSCF server 22 serves in particular to manage routing to other terminals managed by the same IMS network 1, and the routing of signaling between the IMS network 1 and other networks;
- at least one proxy call server control function (P-CSCF) server; the P-CSCF server 21 serves as a connection entity between the network 1 and the access network used by the UE 10; the P-CSCF server 28 serves as a connection entity between the network 1 and either the UE 11 or an access network used by the UE 11; all SIP signaling exchanged between the UE 10 (or 11) and the S-CSCF server 27 passes via the P-CSCF server 21 (or 28);
- at least one database server of the HSS type; the HSS 24 contains the profile of the user of the UE 11 in terms of authentication data, location data, and subscribed services data;
- at least one message summary or voice message (VM) server 25; the VM server 25 manages any subscription of the UE 11 to events concerning the deposit and/or consultation of messages for the user of the UE 11, and it notifies the client device 11 when such events occur;
- at least one instant messaging (IM) server 26 (as mentioned above); when the user of the UE 11 subscribes to the instant messaging service (possibly via an RCS-e service), this user can engage in "instant" on-line dialog with other subscribers to this service;
- at least one telephony application server (TAS) 29; the TAS manages any telephone services to which the user of the UE 10 has subscribed with the operator of the network 1, such as telephone number presentation or call forwarding; and
- at least one BGCF server 30 (as mentioned above).

The voice messaging (VM), instant messaging (IM), and telephony application server (TAS) servers 25, 26, and 29 are examples of so-called "application servers" (AS).

The 3GPP standard TS 24.229 (cf. in particular Version 11.5.0 of the standard, clause 5.4.3.3, items 3C and 3D, and also Appendix I) specifies that when the S-CSCF server 27 receives a service request from the I-CSCF server 22 targeting an already registered user UE 11:
- the S-CSCF server 27 verifies that the service complies with the subscription of the UE 11 with the operator of the network 1; and
- if so, the S-CSCF server 27 forwards the request to an appropriate contact address of the UE 11 (for example, if the requested service is a telephone call to the telephone number of the user of the UE 11, then said contact address is conventionally an IP address associated with said telephone number).

There follows a description of the steps of a method of routing a service request targeting the UE 11, in an implementation of the invention.

During a step E1, the UE 10, which subscribes at least to the VoIP service (and possibly also to the RCS-e service) on the IP network to which it belongs (which may be an IMS network, and in particular the network 1), issues a service request targeting the user of the UE 11, and this service request is transmitted in conventional manner to the terminating S-CSCF server 27 in charge of the UE 11 in the IMS network 1.

During a step E2, the S-CSCF server 27 performs a certain number of predetermined verifications. In particular, on the basis of elements contained in the service request (see details given below), the S-CSCF server 27 verifies whether the requested service is a telephone call. If so, the S-CSCF server 27 also verifies:
- whether the called party, i.e. the user of the UE 11, has subscribed to a telephone service with the operator of the IMS network 1; and
- whether the telephone number given in the request does indeed comply with standards relating to telephone numbers.

In a variant, the S-CSCF server 27 begins on the basis of elements contained in the service request, by verifying whether the requested service complies with the subscription of the user of the UE 11 with the IMS network 1; if not, the S-CSCF server 27 verifies whether the requested service is a telephone service; if the requested service is indeed a telephone service, then the S-CSCF server 27 also verifies whether the format of the telephone number given in the request complies with the standards relating to telephone numbers.

If during the step E2, the S-CSCF server 27 determines that the requested service is a telephone call, but that the format of the telephone number in the request does not comply with the standards, then the call is rejected in a step E3a.

If during the step E2, the S-CSCF server 27 determines that the requested service is a telephone call, that the format of the telephone number given in the request complies with the standards, and that the user of the UE 11 has subscribed to a telephone service with the operator of the network 1, then the call is transmitted to the UE 11 during a step E3b.

In contrast, if during the step E2, the S-CSCF server 27 determines that the requested service is a telephone call and that the format of the telephone number as given complies with the standards, but that the user of the UE 11 has not subscribed to a telephone service with the operator of the network 1 (as applies for example to a "pure RCS-e" subscriber), then, during a step E3c, the request is transmitted to a BGCF server 30 in order to route the call via the telephone network 2 to which the UE 11 belongs, i.e. a mobile telephone network if the UE 11 is a mobile terminal, or a fixed telephone network (e.g. the public switched telephone network (PSTN)) if the UE 11 is a fixed terminal.

Concerning the information used by the S-CSCF server 27 for determining the type of service requested and for consequently deciding on the appropriate routing, it is possible to envisage at least the following two variants (singly or in combination).

In a first variant, the S-CSCF server 27 relies on an IMS communication service identifier (ICSI) that appears for example in the "P-asserted-service" header of the received service request. ICSIs are defined in the above-mentioned TS 24.229 standard, in particular in Section 7.2A.8. Thus, if the ICSI corresponds to a telephone service, if the request-URI of the request is a telephone number, and if the called subscriber has not subscribed to the voice over IP service with the operator of the IMS network 1, then the S-CSCF server selects a BCGF server 30 for conveying the call to the telephone network 2.

In a second variant, the S-CSCF server 27 relies on the content itself of the received service request. As non-limiting examples, mention may be made of using:
the content of the session description protocol (SDP), and in particular an audio media type, if any, specified in the SDP content; and/or
the "content-type" header; and/or
the "accept-contact" header.

The invention may be performed within S-CSCF servers by means of software and/or hardware components.

Software components may be incorporated in a conventional computer program for managing a network node. That is why, as mentioned above, the present invention also provides a computer system. In conventional manner, the computer system includes a central processor unit using signals to control a memory and also an inlet unit and an outlet unit. Furthermore, the computer system may be used for executing a computer program having instructions for managing the operation of an S-CSCF server of the invention.

Specifically, the invention also provides a computer program that is downloadable from a communications network and that includes instructions for managing the operation of an S-CSCF server of the invention when it is executed on a computer. The computer program may be stored on a computer readable medium and it may be executed by a microprocessor.

The program may use any programming language and may be in the form of source code, object code, or code intermediate between source code and object code, such as in a partially compiled form, or in any other desirable form.

The invention also provides a non-removable, or a partially or completely removable data medium that is readable by a computer and that includes instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or magnetic recording means, such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to manage the operation of an S-CSCF server of the invention.

Although the present disclosure has been described with reference to one or more examples, workers skilled in the art will recognize that changes may be made in form and detail without departing from the scope of the disclosure and/or the appended claims.

The invention claimed is:

1. A serving call server control function (S-CSCF) server in an IMS network, the server comprising:
   means for receiving a service request targeting a client device belonging to said IMS network and under the charge of said S-CSCF server; and
   means for using information elements contained in said service request to perform verifications comprising:
      determining that the requested service is a telephone service; and
      determining from a stored user profile that a user of the target client device targeted in the service request has not subscribed to a telephone service with the operator of the IMS network; and
   means for, if the result of said verifications is positive, directing the service request to a telephone network to which said target client device belongs.

2. The S-CSCF server according to claim 1, further comprising means for use when determining that the requested service is a telephone service to verify also that the format of the telephone number given in the service request does indeed comply with the standards relating to the format of telephone numbers.

3. The S-CSCF server according to claim 1, wherein said information elements contained in the service request include an IMS communication service identifier (ICSI).

4. The S-CSCF server according to claim 1, wherein said information elements contained in the service request are in at least one of the session description protocol (SDP) part, the "-content type-" header, or the "-accept contact-" header of said request.

5. A routing method for routing a service request targeting a client device belonging to an IMS network, the method comprising the following acts:
   a) receiving said service request by a terminating serving call server control function (S-CSCF) server in charge, in said IMS network of the target client device;
   b) said S-CSCF server using information elements contained in said service request to perform verifications comprising:
      determining that the requested service is a telephone service; and
      determining from a stored user profile that a user of the target client device targeted in the service request has not subscribed to a telephone service with the operator of the IMS network; and
   c) if the result of said verifications is positive, the S-CSCF server directing the service request to a telephone network to which said target client device belongs.

6. The routing method according to claim 5, wherein if said S-CSCF server determines in said act b) that the requested service is a telephone service, then the S-CSCF server also verifies that the format of the telephone number given in the service request does indeed comply with the standards relating to the format of telephone numbers.

7. The routing method according to claim 5, wherein said information elements contained in the service request include an IMS communication service identifier.

8. The routing method according to claim 5, wherein said information elements contained in the service request are in at least one of the session description protocol (SDP) part, the "-content type-" header, or the "-accept contact-" header of said request.

9. The routing method according to claim 5, wherein said target client device is a mobile terminal.

10. The routing method according to claim 5, wherein said target client device is a fixed terminal.

11. A non-transitory computer-readable medium comprising computer program code instructions stored thereon for managing operation of a serving call server control function (S-CSCF) server when executed on a processor of the S-CSCF server, the instructions comprising:
　a) instructions that configure the S-CSCF server to receive a service request targeting a client device belonging to an IMS network, wherein the S-CSCF server is in charge, in said IMS network of the target client device;
　b) said S-CSCF server using information elements contained in said service request to perform verifications comprising:
　　determining that the requested service is a telephone service; and
　　determining from a stored user profile that a user of the target client device targeted in the service request has not subscribed to a telephone service with the operator of the IMS network; and
　c) if the result of said verifications is positive, the S-CSCF server directing the service request to a telephone network to which said target client device belongs.

* * * * *